US009412038B1

(12) United States Patent
Koven et al.

(10) Patent No.: US 9,412,038 B1
(45) Date of Patent: Aug. 9, 2016

(54) DETERMINING A COLOR VALUE OF AN ARTICLE OF FABRIC (71) Applicant: The Dial Corporation, Scottsdale, AZ (US)

(72) Inventors: Stephen Koven, Scottsdale, AZ (US); Stephen E. Decker, Los Altos, CA (US); Jordan Mack, San Jose, CA (US)

(73) Assignee: THE DIAL CORPORATION, Scottsdale, AZ (US)

( * ) Notice: Subject to any disclaimer, the term of this patent is extended or adjusted under 35 U.S.C. 154(b) by 0 days.

(21) Appl. No.: 14/612,792

(22) Filed: Feb. 3, 2015

(51) Int. Cl.
*G06K 9/00* (2006.01)
*G06K 9/46* (2006.01)
*G06T 7/40* (2006.01)
*G06K 9/62* (2006.01)

(52) U.S. Cl.
CPC .............. *G06K 9/4652* (2013.01); *G06K 9/46* (2013.01); *G06K 9/4661* (2013.01); *G06K 9/6201* (2013.01); *G06K 9/6267* (2013.01); *G06T 7/408* (2013.01); *G06K 2009/4666* (2013.01)

(58) Field of Classification Search
None
See application file for complete search history.

(56) References Cited

U.S. PATENT DOCUMENTS

| 6,654,048 | B1 * | 11/2003 | Barrett-Lennard ....... G01J 3/46 348/135 |
| 6,784,997 | B2 * | 8/2004 | Lorenz .................. D06F 39/003 356/429 |
| 2006/0038901 | A1 * | 2/2006 | Tapes ..................... H04N 9/735 348/254 |
| 2008/0276964 | A1 * | 11/2008 | Hendrickson ......... D06F 35/005 134/18 |
| 2009/0086192 | A1 * | 4/2009 | He .......................... G01J 1/124 356/73 |
| 2012/0019649 | A1 |  1/2012 | Nixon et al. |
| 2012/0082374 | A1 * | 4/2012 | Agarwal .............. H04N 1/6088 382/162 |
| 2012/0110747 | A1 |  5/2012 | Yum et al. |
| 2014/0018962 | A1 |  1/2014 | Jung et al. |
| 2014/0170757 | A1 |  6/2014 | Tsai et al. |

FOREIGN PATENT DOCUMENTS

JP       10104077 A  *  4/1998
WO   WO-2011/001380 A2    1/2011

* cited by examiner

*Primary Examiner* — Sean Motsinger
(74) *Attorney, Agent, or Firm* — Fabian VanCott; Steven Nichols (57) ABSTRACT

Methods and systems are provided for determining a color value of an article of fabric. Determining a color value of an article of fabric includes obtaining, from a mobile device, a digital image of an article of fabric with a calibration card, calculating a fabric luminosity value for the article of fabric from the digital image, comparing the fabric luminosity value with calibration luminosity values to create a comparison, and determining, based on the comparison, a color value of the article of fabric.

16 Claims, 6 Drawing Sheets

DETERMINING A COLOR VALUE OF AN ARTICLE OF FABRIC

FIELD OF THE INVENTION

The present invention generally relates to determining a color value of an article of fabric, and more particularly relates to determining the color value of the article of fabric before and after subjecting the article of fabric to a laundry process.

BACKGROUND OF THE INVENTION

Articles of fabric may include clothing and bedding. The clothing and bedding may include shirts, pants, blankets, bed sheets, and other articles of fabric. The articles of fabric may be dyed several colors such as black, blue, green, or other colors at time of manufacture. Further, the articles of fabric may be bleached white at the time of manufacture to give the articles of fabric a white appearance.

Accordingly, it is desirable to determine a color value of the article of fabric before and after subjecting the article of fabric to a laundry process such that the laundry process may be adjusted to improve the color value of the article of fabric. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method is provided for determining a color value of an article of fabric. The method includes obtaining, from a mobile device, a digital image of an article of fabric with a calibration card, calculating a fabric luminosity value for the article of fabric from the digital image, comparing the fabric luminosity value with calibration luminosity values to create a comparison, and determining, based on the comparison, a color value of the article of fabric.

A system for determining a color value of an article of fabric includes a processor and computer program code communicatively coupled to the processor. The computer program code includes an obtaining engine to obtain, from a mobile device, a digital image of an article of fabric with a calibration card, an identifying engine to identify the article of fabric, a calibration calculating engine to calculate calibration luminosity values from the digital image, a fabric calculating engine to calculate a fabric luminosity value for the article of fabric from the digital image; a comparing engine to compare the fabric luminosity value with the calibration luminosity values to create a comparison, a determining engine to determine, based on the comparison, a color value of the article of fabric, and a presenting engine to present, via a user interface (UI) of the mobile device, a recommendation to improve the color value of the article of fabric.

A computer program product is provided for determining a color value of an article of fabric. The computer program product includes a non-transitory tangible computer readable storage medium. The tangible computer readable storage medium includes computer readable program code embodied therewith, the computer readable program code includes program instructions that, when executed, cause a processor to calculate calibration luminosity values from a digital image, calculate a fabric luminosity value for an article of fabric from the digital image, compare the fabric luminosity value with the calibration luminosity values to create a comparison, determine, based on the comparison, a color value of the article of fabric, and present, via a UI of the mobile device, a recommendation to improve the color value of the article of fabric.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, articles of fabric may be bleached white at the time of manufacture to give the articles of fabric a white appearance. Further, the articles of fabric may be dyed a color to give the articles of fabric a color appearance. To maintain and/or improve the color appearance of the article of fabric and to clean the articles of fabric, the article of fabric is subjected to a laundry process. The laundry process may include washing the article of fabric, via a washing machine, at a specific temperature, with a detergent, utilizing a specific setting of the washing machine, or combinations thereof. Further, the laundry process can broadly include pre-treating, hand washing, dry cleaning, and other laundry processes.

However, over time the article of fabric may be subjected to stains, use, non-optimal laundry processes, or combinations thereof. This can result in the article of fabric losing its color appearance and/or white appearance. If the article of fabric loses too much of its color appearance and/or white appearance, the article of fabric is often discarded.

The principles described herein include a system and a method for determining a color value of an article of fabric. Such a system and method include obtaining, from a mobile device, a digital image of an article of fabric with a calibration card, calculating a fabric luminosity value for the article of fabric from the digital image, comparing the fabric luminosity value with calibration luminosity values to create a comparison, and determining, based on the comparison, a color value of the article of fabric. Such a method and system allow a user to determine a color value of the article of fabric before and after subjecting the article of fabric to a laundry process. Further, a recommendation may be presented to allow the user to improve the color value of the article of fabric.

In the specification and appended claims, the term "article of fabric" means a textile that may be subjected to a laundry process. An article of fabric may include clothing such as a T-shirt, a dress shirt, pants, coats, sweaters, ties, and other clothing. Further, an article of fabric may include other types of textiles such as sheets, blankets, comforters, couch covers, and other textiles that may be subjected to the laundry process.

In the specification and appended claims, the term "calibration card" means a mechanism used to calculate calibration luminosity values such that a color value of an article of fabric is accurate. The calibration card may include a number of regions. The regions may include a black region and a white region.

In the specification and appended claims, the term "fabric luminosity value" means a number between zero and two-hundred fifty five that represents an average red green blue (RGB) value of a sample area of a digital image associated with an article of fabric. Further, the fabric luminosity value, when compared with a calibration luminosity value, may be used to determine a color value.

In the specification and appended claims, the term "calibration luminosity value" means a number between zero and two-hundred fifty five that represents an average RGB value of a white region or a black region of a calibration card in a digital image. The calibration luminosity values may be based on an analysis of pixels of the digital image associated with the white region and the black region of the calibration card. Further, the calibration luminosity value associated with the white region of the calibration card may represent a maximum calibration luminosity value. The calibration luminosity value associated with the black region of the calibration card may represent a minimum calibration luminosity value.

In the specification and appended claims, the term "comparison" means a relationship between calibration luminosity values and a fabric luminosity value. The comparison may be used to determine a color value for an article of fabric.

In the specification and appended claims, the term "color value" means a true representation of a color of an article of fabric. The color value may be based on a comparison of a calibration luminosity value and a fabric luminosity value.

In the specification and appended claims, the term "recommendation" means a process or a series of step that may be utilized to improve a color value of an article of fabric. The recommendation may be displayed, via a user interface (UI), to a user.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
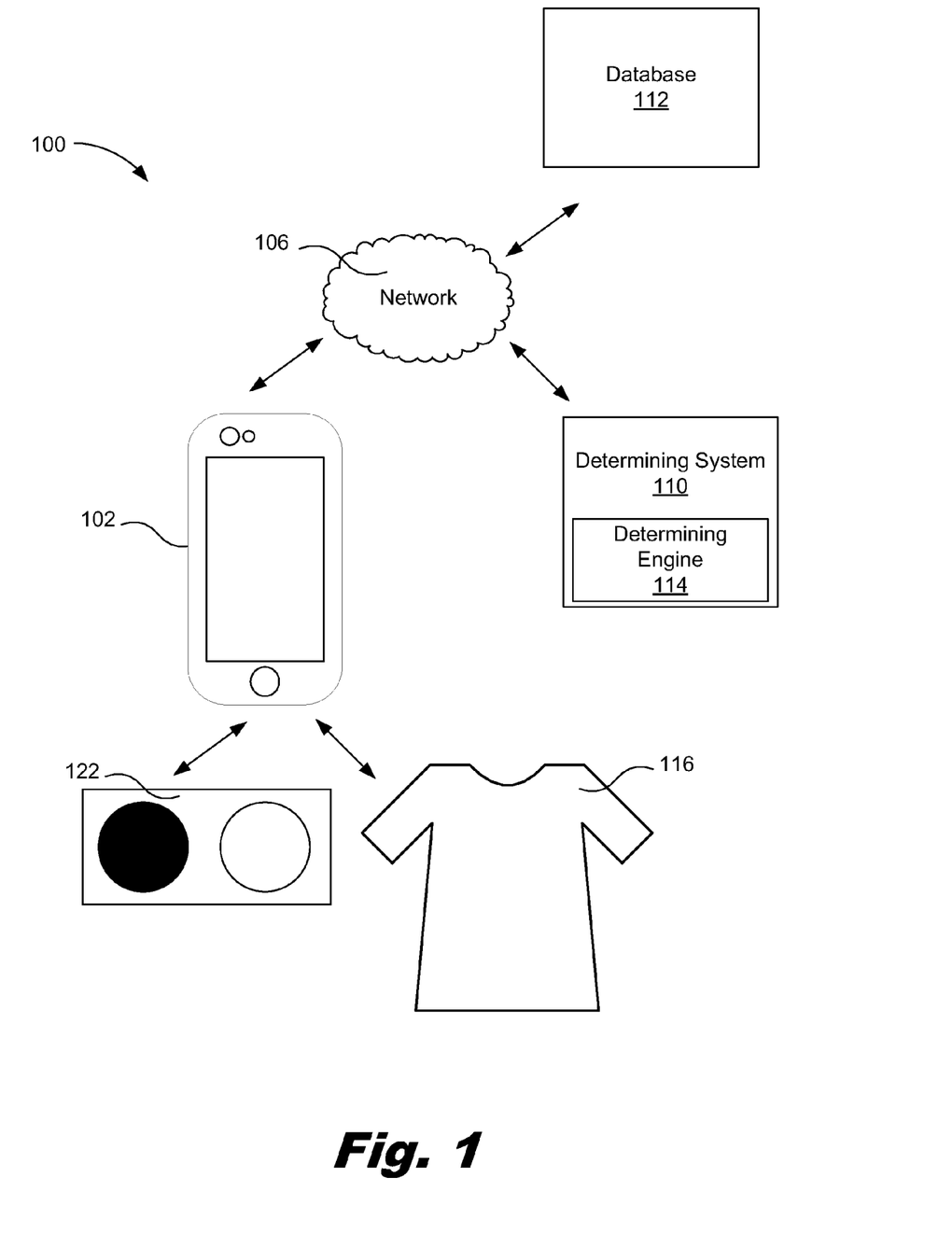
FIG. 1 is a diagram of a system for determining a color value of an article of fabric, according to one example of principles described herein.

FIG. 1 is a diagram of a system for determining a color value of an article of fabric, according to one example of principles described herein. As will be described below, a determining system is in communication with a network to obtain, from a mobile device, a digital image of an article of fabric with a calibration card. The determining system calculates a fabric luminosity value for the article of fabric from the digital image. Further, the determining system compares the fabric luminosity value with calibration luminosity values to create a comparison. The determining system determines, based on the comparison, a color value of the article of fabric. More information about the determining system will be described below.

As illustrated in FIG. 1, the system (100) includes a mobile device (102). The mobile device (102) may be a handheld device that allows a user to capture digital images. As will be described in other parts of this specification, the mobile device (102) captures a digital image of an article of fabric (116) with a calibration card (122). The digital image is then received by a determining system (110) to determine a color value of the article of fabric (116).

As illustrated in FIG. 1, the system (100) includes a determining system (110). The determining system (110) obtains, from the mobile device (102), the digital image of the article of fabric (116) with the calibration card (122). This allows the determining system (110) to obtain one digital image that includes the article of fabric (116) and the calibration card (122) photographed via the same camera of the mobile device (102) in the same environment at the same time.

The determining system (110) calculates a fabric luminosity value for the article of fabric (116) from the digital image. As will be described in other parts of this specification, the fabric luminosity value may be a number between zero and two-hundred fifty five that represents an average RGB value of a sample area of the digital image associated with the article of fabric (116).

Further, the determining system (110) compares the fabric luminosity value with calibration luminosity values to create a comparison. The comparison aids the determining system (110) to determine a color value by compensating for the camera quality of the mobile device (102), skill of a user, and environmental factors. Environmental factors may include a type of light, an intensity of the light, other environmental factors, or combinations thereof that affect the digital image.

The determining system (110) further determines, based on the comparison, a color value of the article of fabric (116). The determining system (110) may utilize a determining engine (114) to determine, based on the comparison, the color value of the article of fabric (116). The color value may be stored in a database (112) to allow the determining system (110) to track changes to the color value for the article of fabric (116) over time and multiple washes. By tracking the color value over time and multiple washes, the user is able to determine if the color value for the article of fabric increases or decreases. Such a system (100) allows a user to determine a color value of the article of fabric before and after subjecting the article of fabric (116) to a laundry process on one or more occasions. More information about the determining system (110) will be described in other parts of this specification.

While this example has been described with reference to the determining system being located over the network, the determining system may be located in any appropriate location. For example, the determining system may be located in a user device, a database, a mobile device, a server, other locations, or combinations thereof. Further, while this example has been described with reference to storing a color value in a database, the system may store other information relating to the article of fabric. For example, images of the article of fabric may be stored in the database. As a result, when subjecting the article of fabric to products that renew fabrics, the user is able to visually determine, via the digital images of the article of fabric, that the product has renewed the article of fabric.

While this example has been described with reference to the determining system obtaining a digital image from a mobile device such as a smartphone, the determining system may obtain a digital image from other devices. Other devices may include a washing machine with a camera to obtain the digital image, other mobile devices such as a tablet, a smart-watch, or other devices.

Figure 2:
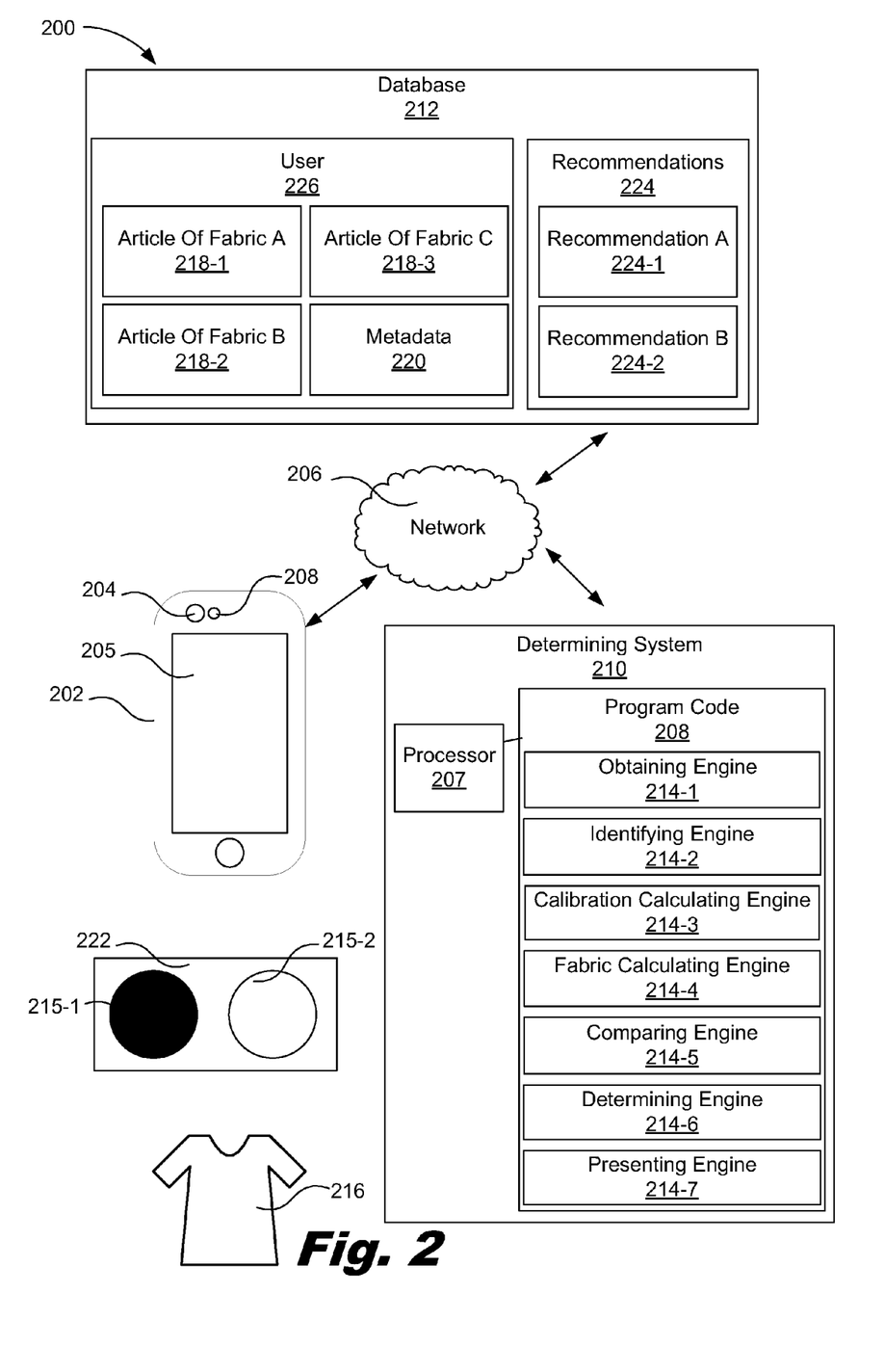
FIG. 2 is a diagram of a system for determining a color value of an article of fabric, according to one example of principles described herein.

FIG. 2 is a diagram of a system for determining a color value of an article of fabric, according to one example of principles described herein. As mentioned above, a determining system is in communication with a network to obtain, from a mobile device, a digital image of an article of fabric with a calibration card. The determining system calculates a fabric luminosity value for the article of fabric from the digital image. Further, the determining system compares the fabric luminosity value with calibration luminosity values to create a comparison. The determining system determines, based on the comparison, a color value of the article of fabric. More information about the determining system will be described below.

As illustrated in FIG. 2, the system (200) includes a mobile device (202). The mobile device (202) may include a number of features. The features may include a camera (204) to capture a digital image of a calibration card (222) and an article of fabric (216). The features may further include a light source (208) to illuminate the calibration card (222) and the article of fabric (216) while capturing the digital image. In some environments the natural lighting may be poor. Natural lighting that is poor may result in a poor quality of the digital image of the calibration card (222) and the article of fabric (216). As a result, the light source (208) may be activated while capturing the digital images such that the light source (208) illuminates the calibration card (222) and the article of fabric (216). This results in useable digital images that can be analyzed by a determining system (210).

The features may further include a UI (205). As will be described in other parts of this specification, the UI (205) may allow the determining system (210) to present a recommendation to a user. The recommendation may be a process or a series of step that may be utilized to improve a color value of an article of fabric (216).

As illustrated in FIG. 2, the system (200) includes a calibration card (222). The calibration card (222) includes a black region (215-1) and a white region (215-2). As will be described below, when the mobile device (202) captures a digital image of the calibration card (222), pixels of the digital image associated with the black region (215-1) and the white region (215-2) are analyzed to determine the calibration luminosity values. As a result, the calibration card (222) aids the determining system (210) in calibrating the digital image such that the color value for the article of fabric (216) is accurate. In some examples, a user may not have access to the calibration card (222). As a result, a calibration image may be used instead. The calibration image may be a pre-stored digital image in the database (212) that has captured the article of fabric (216) via several mobile devices and in several environments. Further, the calibration image may compensate for limiting factors of the mobile device (202) and environmental factors as described above. As a result, the calibration image may give similar results as the calibration card (222).

While this example has been described with reference to the calibration card including a black region and a white region, the calibration card may include other regions. For example, the calibration card may include a green region, a red region, and a blue region.

As illustrated, the system (200) includes a database (212). The database (212) stores, in memory, information associated with a user (226). The database (212) stores, in memory, information such as information about articles of fabric (218) associated with a user (226). As illustrated the database (212) includes article of fabric A (218-1), article of fabric B (218-2), and article of fabric C (218-3). Article of fabric A (218-1) may include information for a T-shirt. Article of fabric B (218-2) may include information for a dress shirt. Article of fabric C (218-3) may include information for bedding. The information may include digital images, names, color values, and other information associated with of the articles of fabric (218).

Further, the database stores, in memory, metadata (220) associated with the user (226). The metadata (220) may include a location of the articles of fabric (218), a detergent used for washing the articles of fabric (218), a washing machine type, settings of the washing machine used to wash the articles of fabric (218), other laundry products used in the wash, including pre-treaters, laundry boosters such as bleach or non-bleach laundry boosters, starch, fabric softeners, freshness enhancers, the type of fabric for the article of fabric (218), blend detail, purchase data, use of a dryer machine, the number of times the article of fabric (218) has been worn and washed, or combinations thereof. More information about the metadata (220) will be described in other parts of this specification.

Further, the database (210) may store, in memory, recommendations (224) to improve the color value of the articles of fabric (218). As illustrated, the recommendations (224) may include recommendation A (224-1) and recommendation B (224-2). Recommendation A (224-1) may be to increase the water temperature to hot in order to improve the color value of the article of fabric. Recommendation B (224-2) may be to add product X to a subsequent wash to improve the color value of the article of fabric. More information about the recommendations (224) will be described in other parts of this specification.

While this example has been described with reference to the database storing information about three articles of fabric, the database may store information about more than three articles of fabric for multiple users. As a result, the determining system may utilize the information about articles of fabric as a large sample size to refine the recommendations.

As illustrated, the system (200) includes a determining system (210). The determining system (210) includes a processor (207) and computer program code (208). The computer program code (208) includes a number of engines (214). The engines (214) refer to program instructions to perform a designated function. The program code (208) causes the processor (207) to execute the designated function of the engines (214). As illustrated, the determining system (210) includes an obtaining engine (214-1), an identifying engine (214-2), a calibration calculating engine (214-3), a fabric calculating engine (214-4), a comparing engine (214-5), a determining engine (214-6), and a presenting engine (214-7).

The obtaining engine (214-2) obtains, from the mobile device (202), the digital image of the article of fabric (216) with the calibration card (222). As a result, the article of fabric (216) and the calibration card (222) are photographed at the same time and is subjected to the same shading errors. Shading errors may be introduced by an intensity, angle, and color of an available lighting source. The lighting source may be dependent on environmental factors such as if the digital image is captured indoors or outdoors, if the available lighting source is natural light or artificial light, if the light source (208) is turned ON or OFF, other environmental factors, or combinations thereof. Further, since the article of fabric (216) and the calibration card (222) are photographed at the same time, the digital image of the article of fabric (216) and the calibration card (222) is subjected to the same quality. The quality of may be based on characteristics of a lens of the camera (204), the number of pixels the digital sensor of the camera (204) can capture, if the digital image is blurred due to motion of the camera (204), or combinations thereof.

The identifying engine (214-2) identifies the article of fabric (216). The article of fabric (216) may be identified via a user naming the article of fabric (216) and the identifying engine (214-2) receiving the name of the article of fabric (216). Once the identifying engine (214-2) receives the name of the article of fabric (216), the identifying engine (214-2) compares the name of the article of fabric (216) with other names of articles of fabric (218) in the database (212) to determine if a match if found. For example, if the identifying engine (214-2) receives the name of the article of fabric (216) as T-shirt and article of fabric A (218-1) is named T-shirt, the identifying engine (214-2) determines a match is found. If no match is found, the identifying engine (214-2) may create a new entry in the database (212) for the article of fabric (216) and store information associated with the article of fabric (216) in the new entry.

The article of fabric (216) may include a specific tag attached to the article of fabric (216) that is unique among other tags associated with other articles of fabric. In this example, the identifying engine (214-2) identifies the article of fabric (216) via a digital image of a tag associated with the article of fabric (216). The digital image of the tag associated with the article of fabric (216) may be captured via the camera (204) of the mobile device (202). Once the identifying engine (214-2) receives the digital image of the tag associated with the article of fabric (216), the identifying engine (214-2) compares the digital image of the tag with other digital images of tags associated with the articles of fabric (218) in the database (212) to determine if a match is found. If no match is found, the identifying engine (214-2) may create a new entry in the database (212) for the article of fabric (216) and store information associated with the article of fabric (216) in the new entry.

Image recognition may be used to aid the identifying engine (214-2) in identifying the article of fabric (216). An article of fabric such as a dress shirt may have features that distinguish the dress shirt from another article of fabric such as a T-shirt. Once the identifying engine (214-2) receives the digital image of the article of fabric (216), the identifying engine (214-2) compares the digital image of the article of fabric (216) with the digital images of the articles of fabric (218) in the database (212) to determine if a match if found. If no match is found, the identifying engine (214-2) may create a new entry in the database (212) for the article of fabric (216) and store information associated with the article of fabric (216) in the new entry.

The calibration calculating engine (214-3) calculates calibration luminosity values from the digital image. The calibration calculating engine (214-3) calculates calibration luminosity values from the digital image by analyzing pixels of the digital image associated with a white region (215-2) and a black region (215-1) of the calibration card (222). The calibration calculating engine (214-3) analyzes the pixels of the digital image associated with a white region (215-2) by cycling through the pixels associated with the white region (215-2) and retrieving an individual RGB value for each pixel. Depending on the quality of the digital image, the pixels associated with the digital image for the white region (215-2) may be 40×40 pixels for a total of 1600 pixels. A valid range for each RGB value is a whole number between zero and two-hundred fifty five. Further, the calibration calculating engine (214-3) calculates the average combined RGB value over a subset of the pixels within the white region (215-2). The calibration calculating engine (214-3) adds the RGB values together to create a pixel score. When the pixel scores for the white region (215-2) have been determined, the calibration calculating engine (214-3) adds the pixel scores together and divides by the number of pixels to calculate a calibration luminosity value for the white region (215-2). The calibration luminosity value for the white region (215-2) may be a maximum calibration luminosity value that represents the highest color value possible, such as one-hundred.

Similarly, the calibration calculating engine (214-3) analyzes the pixels of the digital image associated with a black region (215-1) by cycling through the pixels associated with the black region (215-1) and retrieving an individual RGB value for each pixel. Depending on the quality of the digital image, the pixels associated with the digital image for the black region (215-1) may be 40×40 pixels for a total of 1600 pixels. A valid range for each RGB value is a whole number between zero and two-hundred fifty five. Further, the calibration calculating engine (214-3) calculates the average combined RGB value over a subset of the pixels within the black region (215-1). The calibration calculating engine (214-3) adds these RGB values together to create a pixel score. When all the pixel scores for the black region (215-1) have been determined, the calibration calculating engine (214-3) adds the pixel scores together and divides by the number of pixels to calculate a calibration luminosity value for the black region (215-1). The calibration luminosity value for the black region (215-1) may be a minimum calibration luminosity value that represents the lowest RGB value possible, such as zero. If the calibration luminosity value for the black region (215-1) is more than the calibration luminosity value for the white region (215-2), the digital image is deemed invalid.

While this example has been described with reference to a specific number of pixels, depending on the quality of the digital image, the camera, and the mobile device, the number of pixels may vary. For example, the number of pixels may be 100×100, 2500×2500, or other numbers of pixels.

The fabric calculating engine (214-4) calculates a fabric luminosity value for the article of fabric from the digital image. The calculating engine (214-4) calculates a fabric luminosity value for the article of fabric from the digital image by determining a sample area of the digital image related to the article of fabric. The sample area of the digital image related to the article of fabric may be a specific area of the digital image. The specific area of the digital image related to the article of fabric may be free from stains. Further, the sample area may include the entire the digital image related to the article of fabric.

The fabric calculating engine (214-4) calculates a fabric luminosity value for the article of fabric from the digital image by further analyzing the pixels of the digital image associated with the sample area of the digital image related to the article of fabric. The fabric calculating engine (214-4) cycles through the pixels associated with sample area of the digital image related to the article of fabric and retrieves an individual RGB value for each pixel. Depending on the quality of the digital image, the pixels associated with the digital image for the sample area may be 100×100 pixels for a total of 10000 pixels. A valid range for each RGB value is a whole number between zero and two-hundred fifty five. Further, the fabric calculating engine (214-4) calculates the average combined RGB value over a subset of the pixels within the sample area. The fabric calculating engine (214-4) adds these RGB values together to create a pixel score. When the pixel scores for the sample area have been determined, the fabric calculating engine (214-4) adds the pixel scores together and divides by the number of pixels to calculate a fabric luminosity value for the sample area.

The comparing engine (214-5) compares the fabric luminosity value with a calibration luminosity value to create a comparison. The fabric luminosity value for the sample area should be between the calibration luminosity value for the black region (215-1) and the calibration luminosity value for the white region (215-2).

The determining engine (214-6) determines, based on the comparison, a color value of the article of fabric. The color value may be a range such as zero to one-hundred. For example, if the article of fabric is supposed to be white, zero may indicate the article of fabric is true black and is absent of white. One-hundred may indicate the article of fabric is true white and is absent of black. Further, the color value may be based on Equation (1) provided below:

$$CV = \frac{(FLV - CLV_b)}{(CLV_w - CLV_b)}. \qquad \text{Equation (1)}$$

In Equation (1) CV refers to the color value, FLV refers to the fabric luminosity value, $CLV_b$ refers to calibration luminosity value of a black region and $CLV_w$ refers to the calibration luminosity value of a white region. This results in a range for the color value between zero and one-hundred. Further, the color value may be symbolic such as not white, white, or really white. Not white may indicate the article of fabric is true black and is absent of a white color. Really white may indicate the article of fabric is true white and is absent of a black color.

The presenting engine (214-7) presents, via a UI of the mobile device (202), a recommendation to improve the color value of the article of fabric. The recommendation may be based on comparing the color value of the article of fabric with a previous color value of the article of fabric stored in the database (212) to determine if the color value has increased or decreased. Further, the recommendation may be based on metadata associated with the article of fabric. The metadata may include a location of the article of fabric, a detergent used for washing the article of fabric, a washing machine type, settings of the washing machine used to wash the article of fabric, or combinations thereof.

An overall example, of the system (200) will now be described. A user may use the mobile device (202) to capture a digital image of the article of fabric (216) with the calibration card (222). The digital image may be a single image that includes both the article of fabric (216) and the calibration card (222). The obtaining engine (214-2) obtains, from the mobile device (202), the digital image of the article of fabric (216) with the calibration card (222) as described above. The identifying engine (214-2) identifies the article of fabric as article of fabric B (218-2). Article of fabric B (218-2) may be a white dress shirt. The calibration calculating engine (214-3) and the fabric calculating engine (214-4) calculate calibration luminosity values and a fabric luminosity value, respectively, from the digital image as described above. The comparing engine (214-5) compares the fabric luminosity value with calibration luminosity values to create a comparison. The determining engine (214-6) determines, based on the comparison, a color value of the article of fabric. The color value may be ninety. Ninety indicates the article of fabric (216) is ninety percent white. The presenting engine (214-7) presents, via a UI of the mobile device (202), a recommendation to improve the color value of the article of fabric (216).

While this example has been described with reference to the determining system determining a color value for an article of fabric before and after a laundry process, the determining system may be used in other applications. For example, the determining system may be utilized for matching paint colors, matching colors for a number of articles of fabric, or combinations thereof.

Figure 3:
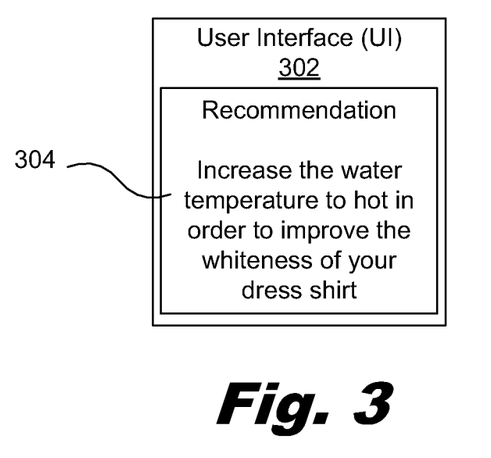
FIG. 3 is a user interface (UI) for presenting a recommendation to improve a color value of an article of fabric, according to one example of principles described herein.

FIG. 3 is a UI for presenting a recommendation to improve a color value of an article of fabric, according to one example of principles described herein. As mentioned above, the determining system presents, via a UI of the mobile device, a recommendation to improve the color value of the article of fabric.

As illustrated, a UI (302) may present, to a user, a recommendation to improve the color value of the article of fabric. The recommendation (304) recommends increasing the water temperature to hot in order to improve the whiteness of your dress shirt.

Figure 4:
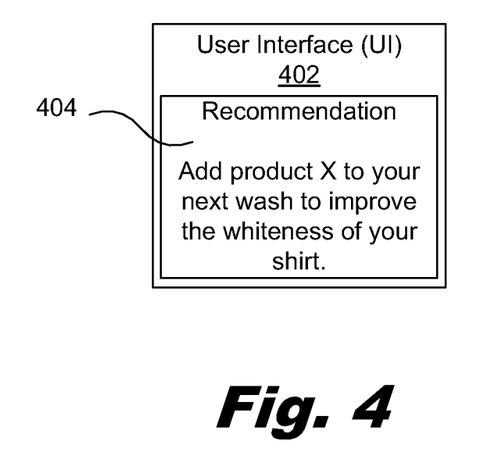
FIG. 4 is a UI for presenting a recommendation to improve a color value of an article of fabric, according to one example of principles described herein.

FIG. 4 is a UI for presenting a recommendation to improve a color value of an article of fabric, according to one example of principles described herein. As mentioned above, the determining system presents, via a UI of the mobile device, a recommendation to improve the color value of the article of fabric.

As illustrated, a UI (402) may present, to a user, a recommendation to improve the color value of the article of fabric. The recommendation (404) recommends adding product X to a subsequent wash to improve the whiteness of your shirt.

Figure 5:
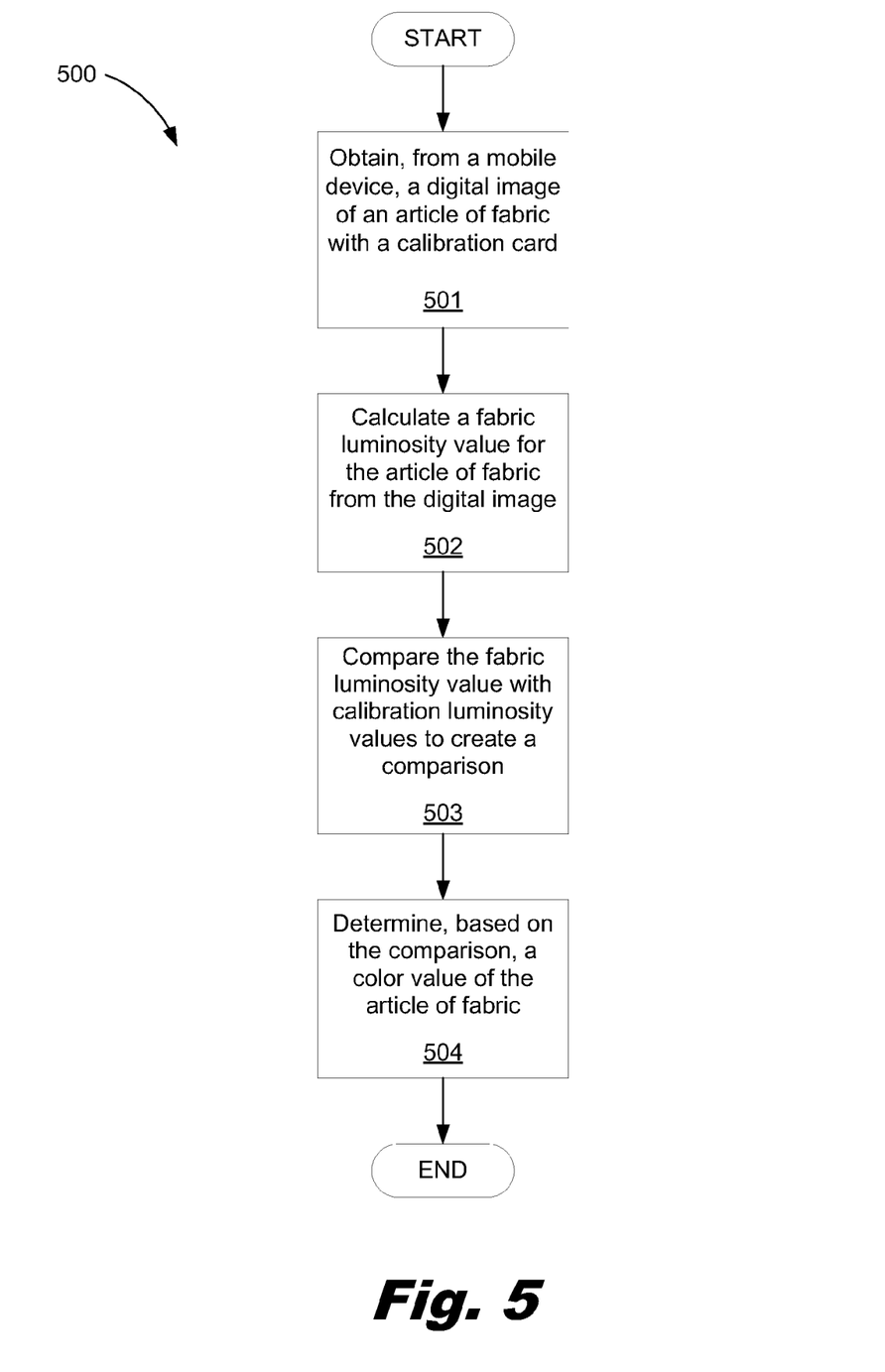
FIG. 5 is a flowchart of a method for determining a color value of an article of fabric, according to one example of principles described herein.

FIG. 5 is a flowchart of a method for determining a color value of an article of fabric, according to one example of principles described herein. The method (500) may be executed by the determining system (110) of FIG. 1. Further, the method (500) may be executed by other systems (i.e. system 200, system 700 and system 800). In this example, the method (500) includes obtaining (501), from a mobile device, a digital image of an article of fabric with a calibration card, calculating (502) a fabric luminosity value for the article of fabric from the digital image, comparing (503) the fabric luminosity value with calibration luminosity values to create a comparison, and determining (504), based on the comparison, a color value of the article of fabric.

As mentioned above, the method (500) includes obtaining (501), from a mobile device, a digital image of an article of fabric with a calibration card. The method (500) may obtain one digital image of an article of fabric with a calibration card. The method (500) may obtain several digital images of a number of articles of fabric with a calibration card.

As mentioned above, the method (500) includes calculating (502) a fabric luminosity value for the article of fabric from the digital image. The method (500) includes calculating a fabric luminosity value for the article of fabric from the digital image by determining a sample area of the digital image related to the article of fabric, analyzing pixels of the sample area, and determining, based on the pixels of the sample area, the fabric luminosity value. The fabric luminosity value may be based on a range such as zero to two-hundred fifty five as described above.

As mentioned above, the method (500) includes comparing (503) the fabric luminosity value with calibration luminosity values to create a comparison. The comparison may be a relationship between the calibration luminosity value and the fabric luminosity value. The fabric luminosity value for the sample area is between the calibration luminosity value for the black region and the calibration luminosity value for the white region. If the fabric luminosity value for the sample area is not between the calibration luminosity value for the black region and the calibration luminosity value for the white region, the digital image may be invalid. If the digital image is invalid, the method (500) may include prompting the user to capture another digital image of the article of fabric with the calibration card.

As mentioned above, the method (500) includes determining (504), based on the comparison, a color value of the article of fabric. The color value of the article of fabric may be tracked overtime. For example, a color value may be determined before the article of fabric is subjected to a laundry process. A color value may then be determined after the article of fabric is subjected to a laundry process via the method (500) above. The color value may be determined for a white article of fabric. Further, the color value may be determined for blue, green, red, black, or other colors associated with an article of fabric.

If a fabric luminosity value is greater than a calibration luminosity value for a white region of a calibration card in the digital image, the method (500) assigns the color value to a maximum color value. The maximum color value may be one-hundred.

While this example has been described with reference to the method utilizing a calibration card, the method may utilize other techniques. The method may store in a database digital images of samples of articles of fabric. The digital images may be captured in a number of environments, with a number of cameras, or combinations thereof. As a result, the digital images of the samples of the articles of fabric may be used to calculate calibration luminosity values.

Figure 6:
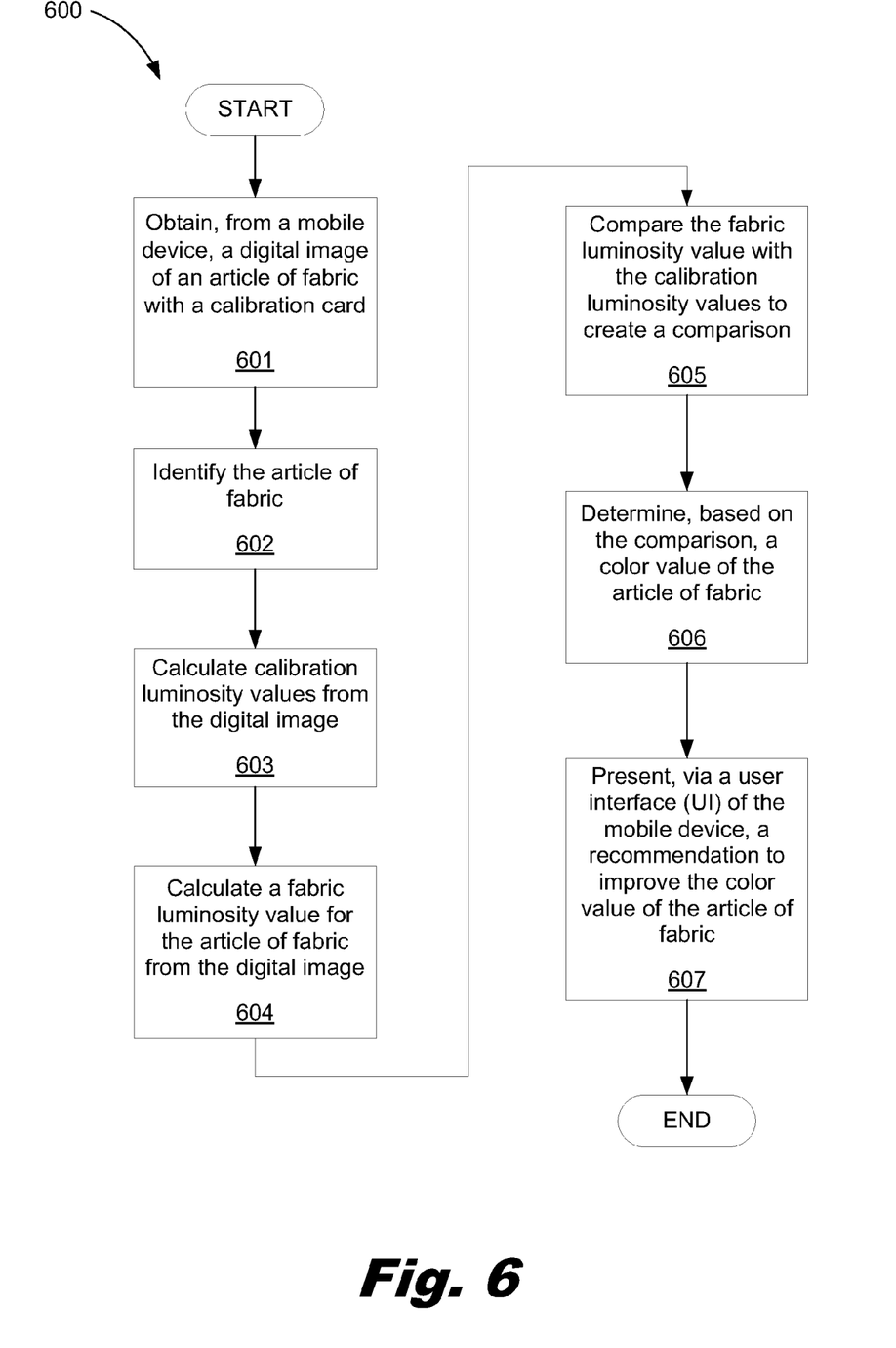
FIG. 6 is a flowchart of a method for determining a color value of an article of fabric, according to one example of principles described herein.

FIG. 6 is a flowchart of a method for determining a whiteness value of an article of fabric, according to one example of principles described herein. The method (600) may be executed by the determining system (110) of FIG. 1. Further, the method (600) may be executed by other systems (i.e. system 200, system 700 and system 800). The method (600) includes obtaining (601), from a mobile device, a digital image of an article of fabric with a calibration card, identifying (602) the article of fabric, calculating (603) calibration luminosity values from the digital image, calculating (604) a fabric luminosity value for the article of fabric from the digital image, comparing (605) the fabric luminosity value with the calibration luminosity values to create a comparison, determining (606), based on the comparison, a color value of the article of fabric, presenting (607), via a UI of the mobile device, a recommendation to improve the color value of the article of fabric.

As mentioned above, the method (600) includes identifying (602) the article of fabric. The method (600) may identify the article of fabric by receiving a digital image of a tag associated with the article of fabric, image recognition, or allowing a user to manually identify the article of fabric, or combinations thereof.

As mentioned above, the method (600) includes calculating (603) calibration luminosity values from the digital image. Calculating the calibration luminosity values from the digital image includes analyzing pixels of the digital image associated with a white region and a black region of the calibration card and determining, based on the pixels, the calibration luminosity values associated with the white region and the black region of the calibration card.

As mentioned above, the method (600) includes presenting (607), via a UI of the mobile device, a recommendation to improve the color value of the article of fabric. The recommendation may be based on comparing the color value of the article of fabric with a previous color value of the article of fabric stored in a database to determine if the color value has increased or decreased. If the color value has increased, the recommendation may include informing the user, via the UI, to continue with the current laundry process.

The recommendation may be based on metadata associated with the article of fabric. The metadata may include a location of the article of fabric. The location of the article of fabric may allow the method (600) to determine if the article of fabric may be subjected to hard water. If the article of fabric is subjected to hard water, the recommendation may include installing a water softener or using a detergent that is optimized for hard water.

The metadata may indicate a detergent used for washing the article of fabric. Some detergents may increase the color value of the article of fabric while other detergents only maintain the color value of the article of fabric. As a result, a recommendation may include using a specific detergent.

Further, the metadata may indicate a washing machine type. Some washing machines may include settings for a laundry process. The settings may include a water temperature setting, a time setting, a soak setting, a spin setting, or combinations thereof. The settings of the washing machine used to wash the article of fabric may be adjusted to improve the color value of the article of fabric. In one example, the setting of the washing machine may be transmitted wirelessly to the determining system and stored as metadata.

Figure 7:
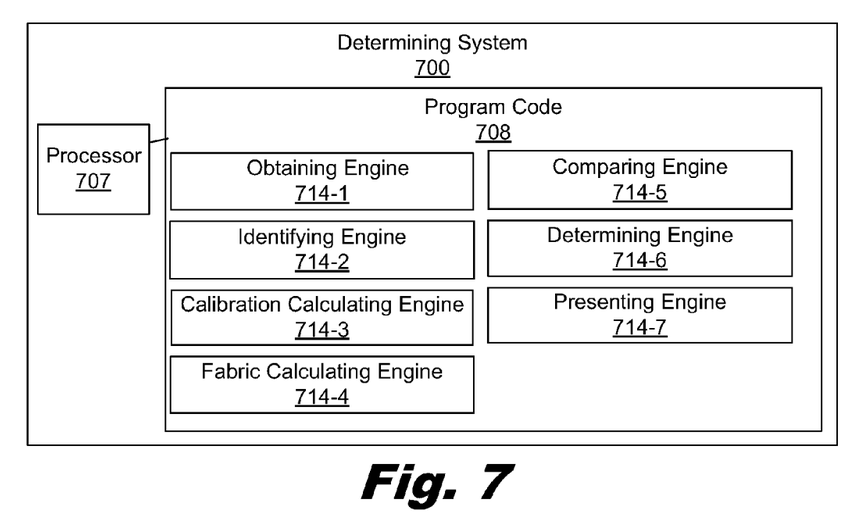
FIG. 7 is a diagram of a determining system, according to one example of the principles described herein.

FIG. 7 is a diagram of a determining system, according to the principles described herein. The determining system (700) includes a processor (707) and computer program code (708). The computer program code (708) includes a number of engines (714). The engines (714) refer to program instructions to perform a designated function. The program code (708) causes the processor (707) to execute the designated function of the engines (714). As illustrated, the determining system (700) includes an obtaining engine (714-1), an identifying engine (714-2), a calibration calculating engine (714-3), a fabric calculating engine (714-4), a comparing engine (714-5), a determining engine (714-6), and a presenting engine (714-7).

The obtaining engine (714-1) obtains, from a mobile device, a digital image of an article of fabric with a calibration card. The obtaining engine (714-1) may obtain one digital image of an article of fabric with the calibration card. The obtaining engine (714-1) may obtain several digital images of a number of articles of fabric with the calibration card.

The identifying engine (714-2) identifies the article of fabric. The identifying engine (714-2) may identify several articles of fabric in a digital image via the methods described above.

The calibration calculating engine (714-3) calculates the calibration luminosity values from the digital image. The calibration calculating engine (714-3) calculates the calibration luminosity values from the digital image by analyzing pixels of the digital image associated with a white region and a black region of the calibration card and determining, based on the pixels, the calibration luminosity values associated with the white region and the black region of the calibration card.

The fabric calculating engine (714-4) calculates a fabric luminosity value for the article of fabric from the digital image. The fabric calculating engine (714-4) may calculate several fabric luminosity values for a number of articles of fabric from a number of digital images.

The comparing engine (714-5) compares the fabric luminosity value with calibration luminosity values to create a comparison. The comparing engine (714-5) compares the fabric luminosity value with a maximum calibration luminosity value associated with a white region of the calibration card in the digital image. The comparing engine (714-5) compares the fabric luminosity value with a minimum calibration luminosity value associated with a black region of the calibration card in the digital image.

The determining engine (714-6) determines, based on the comparison, a color value of the article of fabric. The color value of the article of fabric may be stored in a database and tracked over time.

The presenting engine (714-7) presents, via a UI of the mobile device, a recommendation to improve the color value of the article of fabric. The presenting engine (714-7) may present several recommendations to improve the color value of the article of fabric.

Figure 8:
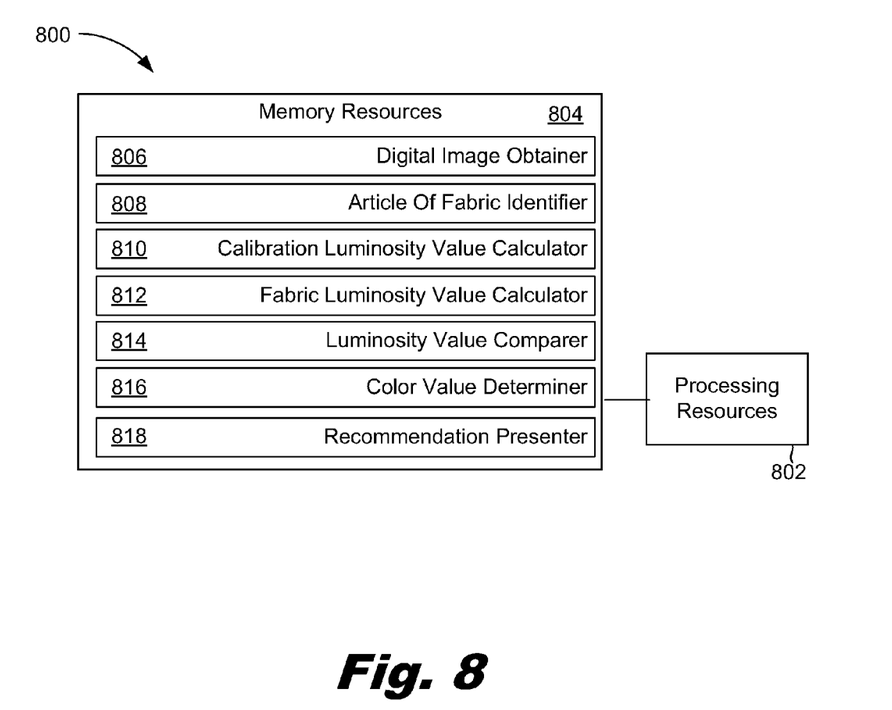
FIG. 8 is a diagram of a determining system, according to one example of the principles described herein.

FIG. 8 is a diagram of a determining system, according to the principles described herein. In this example, the determining system (800) includes processing resources (802) that are in communication with memory resources (804). Processing resources (802) include at least one processor and other resources used to process programmed instructions. The memory resources (804) represent generally any memory capable of storing data such as programmed instructions or data structures used by the determining system (800).

The programmed instructions shown stored in the memory resources (804) include a digital image obtainer (806), an article of fabric identifier (808), a calibration luminosity value calculator (810), a fabric luminosity value calculator (812), a luminosity value comparer (814), a color value determiner (816), and a recommendation presenter (818).

The memory resources (804) include a computer readable storage medium that contains computer readable program code to cause tasks to be executed by the processing resources (802). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The digital image obtainer (806) represents programmed instructions that, when executed, cause the processing resources (802) to obtain, from a mobile device, a digital image of an article of fabric with a calibration card. The article of fabric identifier (808) represents programmed instructions that, when executed, cause the processing resources (802) to identify the article of fabric.

The calibration luminosity value calculator (810) represents programmed instructions that, when executed, cause the processing resources (802) to calculate calibration luminosity values from the digital image. The fabric luminosity value calculator (812) represents programmed instructions that, when executed, cause the processing resources (802) to calculate a fabric luminosity value for the article of fabric from the digital image.

The luminosity value comparer (814) represents programmed instructions that, when executed, cause the processing resources (802) to compare the fabric luminosity value with calibration luminosity values to create a comparison. The color value determiner (816) represents programmed instructions that, when executed, cause the processing resources (802) to determine, based on the comparison, a color value of the article of fabric. The recommendation presenter (818) represents programmed instructions that, when executed, cause the processing resources (802) to present, via a UI of the mobile device, a recommendation to improve the color value of the article of fabric.

Further, the memory resources (804) may be part of an installation package. In response to installing the installation package, the programmed instructions of the memory resources (804) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (802) and the memory resources (804) are located within the same physical component, such as a server, or a network component. The memory resources (804) may be part of the physical component's main memory, caches, registers, non-volatile memory, or elsewhere in the physical component's memory hierarchy. Alternatively, the memory resources (804) may be in communication with the processing resources (802) over a network. Further, the data structures, such as the libraries, may be accessed from a remote location over a network connection while the programmed instructions are located locally. Thus, determining system (800) may be implemented on a user device, on a server, on a collection of servers, or combinations thereof.

The determining system (800) of FIG. 8 may be part of a general purpose computer. However, in alternative examples, the determining system (800) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A method for determining a color value of an article of fabric, comprising:
   obtaining, from a mobile device, a digital image of an article of fabric with a calibration card;
   calculating a fabric luminosity value for the article of fabric from the digital image;
   comparing the fabric luminosity value with calibration luminosity values to create a comparison;
   determining, based on the comparison, a color value of the article of fabric; and
   presenting, via a user interface (UI) of the mobile device, a recommendation to improve the color value of the article of fabric, the recommendation based on the determined color value of the article of fabric;
   wherein the recommendation is based on comparing the color value of the article of fabric with a previous color value of the article of fabric stored in a database to determine if the color value has increased or decreased.

2. The method of claim 1, further comprising calculating the calibration luminosity values from the digital image.

3. The method of claim 2, wherein calculating the calibration luminosity values from the digital image comprises:
   analyzing pixels of the digital image associated with a white region and a black region of the calibration card; and
   determining, based on the pixels, the calibration luminosity values associated with the white region and the black region of the calibration card.

4. The method of claim 1, further comprising identifying the article of fabric.

5. The method of claim 1, wherein the recommendation is based on metadata associated with the article of fabric, the metadata comprising a location of the article of fabric, a detergent used for washing the article of fabric, a washing machine type, settings of the washing machine used to wash the article of fabric, or combinations thereof.

6. The method of claim 1, wherein calculating the fabric luminosity value for the article of fabric from the digital image comprises:
   determining a sample area of the digital image related to the article of fabric;
   analyzing pixels of the sample area; and
   determining, based on the pixels of the sample area, the fabric luminosity value.

7. A system for determining a color value of an article of fabric, the system comprising:
   a processor;
   a non-transitory computer readable storage medium comprising computer program code and communicatively coupled to the processor, the computer program code comprising;
   an obtaining engine to obtain, from a mobile device, a digital image of an article of fabric with a calibration card;
   an identifying engine to identify the article of fabric;
   a calibration calculating engine to calculate calibration luminosity values from the digital image;
   a fabric calculating engine to calculate a fabric luminosity value for the article of fabric from the digital image;
   a comparing engine to compare the fabric luminosity value with the calibration luminosity values to create a comparison;
   a determining engine to determine, based on the comparison, a color value of the article of fabric; and
   a presenting engine to present, via a user interface (UI) of the mobile device, a recommendation to improve the color value of the article of fabric;
   wherein the recommendation is based on comparing the color value of the article of fabric with a previous color value of the article of fabric stored in a database to determine if the color value has increased or decreased.

8. The system of claim 7, wherein the calibration calculating engine calculates the calibration luminosity values from the digital image by:
   analyzing pixels of the digital image associated with a white region and a black region of the calibration card; and
   determining, based on the pixels, the calibration luminosity values associated with the white region and the black region of the calibration card.

9. The system of claim 7, wherein the recommendation is based on metadata associated with the article of fabric, the metadata comprising a location of the article of fabric, a detergent used for washing the article of fabric, a washing machine type, settings of the washing machine used to wash the article of fabric, or combinations thereof.

10. The system of claim 7, wherein the fabric calculating engine calculates the fabric luminosity value for the article of fabric from the digital image by:
    determining a sample area of the digital image related to the article of fabric;
    analyzing pixels of the sample area; and
    determining, based on the pixels of the sample area, the fabric luminosity value.

11. A computer program product for determining a color value of an article of fabric, the computer program product comprising:
    a non-transitory tangible computer readable storage medium, the tangible computer readable storage medium comprising computer readable program code embodied therewith, the computer readable program code comprising program instructions that, when executed, cause a processor to:
    calculate calibration luminosity values from a digital image;
    calculate a fabric luminosity value for an article of fabric from the digital image;
    compare the fabric luminosity value with the calibration luminosity values to create a comparison;
    determine, based on the comparison, a color value of the article of fabric; and
    present, via a user interface (UI) of the mobile device, a recommendation to improve the color value of the article of fabric, wherein the recommendation is based on comparing the color value of the article of fabric with a previous color value of the article of fabric stored in a database to determine if the color value has increased or decreased.

12. The product of claim 11, further comprising computer readable program code comprising program instructions that, when executed, cause the processor to obtain, from a mobile device, the digital image of the article of fabric with the calibration card.

13. The product of claim 11, further comprising computer readable program code comprising program instructions that, when executed, cause the processor to identify the article of fabric.

14. The product of claim 11, wherein the recommendation is based on metadata associated with the article of fabric, the metadata comprising a location of the article of fabric, a detergent used for washing the article of fabric, a washing machine type, settings of the washing machine used to wash the article of fabric, or combinations thereof.

15. The product of claim 11, further comprising computer readable program code comprising program instructions that, when executed, cause the processor to:
    analyze pixels of the digital image associated with a white region and a black region of the calibration card; and
    determine, based on the pixels, the calibration luminosity values associated with the white region and the black region of the calibration card.

16. The product of claim 11, further comprising computer readable program code comprising program instructions that, when executed, cause the processor to:
    determine a sample area of the digital image related to the article of fabric;
    analyze pixels of the sample area; and
    determine, based on the pixels of the sample area, the fabric luminosity value.

* * * * *